3,703,410
5-AMINO-2-NITROBENZOIC ACID AS AN INTUMESCENT AGENT

Shirley H. Roth, Highland Park, N.J., assignor to Cities Service Company, New York, N.Y.
No Drawing. Filed Dec. 28, 1970, Ser. No. 102,242
Int. Cl. C09d 5/18; C09k 3/28
U.S. Cl. 117—136                           3 Claims

ABSTRACT OF THE DISCLOSURE 5-amino-2-nitrobenzoic acid is useful as an intumescent agent with a binder.

BACKGROUND OF THE INVENTION

At present there are available paints which, when applied to a surface and subjected to heat, will intumesce and expand. Conventional commercial prior art intumescent compositions have relied on a combination of three different classes of ingredients; carbonifics, spumifics, and catalysts to form the foamed char. The expanded material, being of a porous, heat insulating character, provides a degree of protection against heat transfer, flame, etc. Unfortunately, however, the previously available intumescent paints have proved troublesome to manufacture due to the difficulty in formulating and balancing the three components described. This invention relates to a single component intumescent agent which will decompose on heating to yield an insulative char providing satisfactory protection against heat and flame.

SUMMARY OF THE INVENTION

It has now been found that 5-amino-2-nitro-benzoic acid is useful as an intumescent agent.

Unfortunately, not all aminonitrobenzoic acids are intumescent agents. Thus, it has been found that although 5-amino-2-nitrobenzoic acid intumesces to an acceptable degree, 4-amino-3-nitrobenzoic acid and 4-nitroanthranilic acid do not intumesce. Additionally, the sulfate salt of 5-amino-2-nitrobenzoic acid does not intumesce.

The 5-amino-2-nitrobenzoic acid is a yellow powdery solid, although it can frequently be found in a moist form containing as much as 30% water, and therefore requires a vehicle to be applied as a paint. Proper selection of a vehicle is often important and generally the vehicles or binders which are well-known in the paint and varnish arts can be used. Thus, such binders as cellulose nitrates of a grade commonly used for lacquers are useful in applying 5-amino-2-nitrobenzoic acid. In addition, there can be used the various synthetic polymers or copolymers which are well-known in the paint and varnish arts including polyvinyl chloride, polyvinyl chloride copolymers with other polymerizable compounds, polyvinyl acetates, oil modified phenolic resin binders, etc. The selected vehicle should be one which undergoes chemical decomposition without explosion at a temperature of about 150 to 250° C. or which is thermoplastic at such temperatures. In either case, the vehicle does not interfere with the intumescence, as would a vehicle which remains rigid at such temperatures.

The 5-amino-2-nitrobenzoic acid can be dispersed in a suitable binder in an amount of from about 4 to about 10 parts of said compound per part of binder, with solvent being added as required. The paint or coating formulation can vary broadly to provide a paint containing from about 10% to about 70% by weight of solids, of which from about 3% to about 30% is binder. Thus, the paint formulation can contain from about 7% to about 70% by weight of intumescent composition to provide a dry coating which can contain from about 7% to about 70% by weight of intumescent agents.

Paints prepared in this manner are adherent to many types of surfaces, for example wood, paper, asbestos, aluminum, and steel (even when primed with zinc chromate). When a surface coated with such a paint or film is heated, as by fire, the paint will intumesce to a very high degree. In so doing, black polymer consisting of closed carbonaceous cells having a high degree of heat resistance, thermal stability and low thermal conductivity is formed. The volatile product of this intumescence is, for the most part, water, nitrogen, ammonia and carbon dioxide.

It has been theorized that the reactions which occur during the intumescence of the compounds described herein are intermolecular condensation reactions involving the functional groups to link and condense rings and to form new rings.

The yield of the foamed char depends upon the time of heating, the degree of flame exposure, the nature of the binder, etc. Yields of 25 to 55% are common.

Generally, the benzene ring can be substituted by one or more additional groups or benzene nuclei which in turn can contain additional amino or, possibly, halogen groups. In addition, the aromatic nucleus can be substituted by one or more nitrogen containing heterocyclic rings which, in turn, can be substituted as described above. As a general proposition, all substituents on the benzene nucleus should leave a position ortho to the amino group free and available for reaction. In some cases the position ortho to the amino group can be occupied, provided that this constituent can be easily removed by heating, as exemplified by decarboxylation.

EXAMPLE 1

One gram of each of the compounds described below was placed in an aluminum dish and flamed with a propane torch in order to determine intumescence. The results are described below.

| Compound: | Intumescence |
|---|---|
| 5-amino-2-nitrobenzoic acid | Yes. |
| 4-amino-3-nitrobenzoic acid | No. |
| 4-nitroanthranilic acid | No. |
| 5-amino-2-nitrobenzoic acid sulfate | No. |
| Anthranilic acid | No. |

5-amino-2-nitrobenzoic acid is a commercial chemical and can be purchased from any convenient source of organic chemicals. One such convenient source is Aldrich Chemical Company, Milwaukee, Wis.

Of additional significance respecting the use of 5-amino-2-nitrobenzoic acid is the fact that it is insensitive to water. One recurring problem encountered in formulating intumescent paints is the fact that they are sensitive to water and atmospheric moisture to an extent such that they are frequently unsatisfactory for outdoor use and are even adversely affected by humidity indoors. The intumescent agent of this invention, which is active in this capacity even after exposure to water, makes possible the formulation of intumescent paints adapted for outdoor use or for other exposure to water conditions.

Therefore, I claim:

1. The method of protecting a substrate from the effect of heat and fire which comprises coating the substrate with a paint containing an effective amount of 5-amino-2-nitrobenzoic acid.

2. An intumescent composition comprising 5-amino-2-nitrobenzoic acid and a binder in a ratio of 4–10/1.

3. An article comprising a substrate coated with a paint composition containing 5-amino-2-nitrobenzoic acid.

References Cited

UNITED STATES PATENTS

| 3,535,130 | 10/1970 | Webb | 117—136 X |
| 2,912,393 | 11/1959 | Stilbert et al. | 117—136 X |
| 3,336,153 | 8/1967 | Juda | 117—136 X |

OTHER REFERENCES

Handbook of Chemistry & Physics, 48th edition, 1967–68, p. C–184, No. b1393, Chemical Rubber Co. publisher.

WILLIAM D. MARTIN, Primary Examiner

H. J. GWINNELL, Assistant Examiner

U.S. Cl. X.R.

106—15 FP